(12) United States Patent
Pszatka et al.

(10) Patent No.: US 9,037,288 B2
(45) Date of Patent: May 19, 2015

(54) METHOD OF PROCESSING MAILPIECES WITH DIGITAL MODELS OF RUNNING MAILPIECES BEING GENERATED ON AN INTERACTIVE TERMINAL

(71) Applicant: Solystic, Gentilly Cedex (FR)

(72) Inventors: Jean-Marc Pszatka, Tremblay en France (FR); Belkacem Benyoub, Palaiseau (FR); Emmanuel Piegay, Paris (FR)

(73) Assignee: SOLYSTIC, Gentilly Cedex (FR)

( * ) Notice: Subject to any disclaimer, the term of this patent is extended or adjusted under 35 U.S.C. 154(b) by 244 days.

(21) Appl. No.: 13/817,700

(22) PCT Filed: Dec. 6, 2012

(86) PCT No.: PCT/FR2012/052824
§ 371 (c)(1),
(2) Date: Feb. 19, 2013

(87) PCT Pub. No.: WO2013/088029
PCT Pub. Date: Jun. 20, 2013

(65) Prior Publication Data
US 2014/0236347 A1   Aug. 21, 2014

(30) Foreign Application Priority Data
Dec. 15, 2011   (FR) .................................. 11 61708

(51) Int. Cl.
G06F 7/00   (2006.01)
B07C 3/14   (2006.01)
B07C 3/00   (2006.01)
G06K 9/32   (2006.01)

(52) U.S. Cl.
CPC ... *B07C 3/14* (2013.01); *B07C 3/00* (2013.01); *G06K 9/3216* (2013.01)

(58) Field of Classification Search
None
See application file for complete search history.

(56) References Cited

U.S. PATENT DOCUMENTS

| 7,978,878 | B2 | 7/2011 | Caillon et al. |
| 2004/0005080 | A1 | 1/2004 | Hayduchok |
| 2009/0141934 | A1* | 6/2009 | Caillon et al. ................ 382/102 |

FOREIGN PATENT DOCUMENTS

| EP | 1 519 796 | 4/2005 |
| EP | 1 622 065 | 2/2006 |

* cited by examiner

*Primary Examiner* — Yolanda Cumbess
(74) *Attorney, Agent, or Firm* — Ware, Fressola, Maguire & Barber LLP

(57) ABSTRACT

A method of processing mailpieces, in which they are fed in series into a sorting machine comprising a sorting conveyor and sorting outlets, an image of each mailpiece is formed in the machine, processing is applied to the image for automatically recognizing address information for the purpose of automatically directing the mailpiece towards a determined sorting outlet, a digital model of running mailpieces or a "run" is built in a database prior to feeding the mailpieces into the machine, the model being built on the basis of an image of a mailpiece, and being defined by data characterizing the graphical appearance of the mailpiece in the image formed from an interactive acquisition terminal located remote from the machine, and the run model is associated in said database with indications usable by the recognition processing, which indications are also input from said interactive acquisition terminal.

19 Claims, 2 Drawing Sheets

METHOD OF PROCESSING MAILPIECES WITH DIGITAL MODELS OF RUNNING MAILPIECES BEING GENERATED ON AN INTERACTIVE TERMINAL

CROSS REFERENCE TO RELATED APPLICATIONS

This application is the U.S. National Stage of International Application Number PCT/FR2012/052824 filed on Dec. 6, 2012, which application is claiming priority under 35 USC §119 to French Patent Application No. 1161708 filed on Dec. 15, 2011, which applications are hereby incorporated by reference.

TECHNICAL FIELD

The field of the invention is the field of automatically sorting batches of uniform mailpieces, i.e. running mailpieces or runs of mailpieces, it being possible for the mailpieces to be letters, "flats" (i.e. large-format flat articles, e.g. magazines or newspapers wrapped in plastic or in paper), or indeed parcels.

The invention relates more particularly to a method of processing mailpieces, in which method mailpieces are fed in series into a postal sorting machine comprising a sorting conveyor and sorting outlets, a digital image of each mailpiece is formed in the machine, and processing is applied to each digital image for automatically recognizing address information for the purpose of automatically directing the corresponding mailpiece through the conveyor towards a determined sorting outlet of the machine.

PRIOR ART

Detecting runs is well known in processing bulk mailer mail. Conventionally, the mailpieces of a bulk mailer (a user batch) constitute runs and when a run of mailpieces is fed into a sorting machine for a first sorting pass, the operator sets parameters for the sorting machine to specify for the address recognition processing the two-dimensional position of the recipient address block in the digital images of the mailpieces in the run. That setting can be performed using a display screen of the sorting machine by pointing on the screen to the position of the region of interest corresponding to the recipient address block or indeed by feeding a specific separator through the sorting machine ahead of mailpieces of the run, the region of the recipient address block being marked on said specific separator, as described in U.S. Pat. No. 7,978,878.

However, such known methods of identifying runs of mailpieces suffer from the drawback of requiring the operator to act on the sorting machine, thereby affecting the overall throughput rate of the sorting machine and actually delaying the sorting process itself. In practice, those techniques for manually identifying runs are used only for runs of very large volumes (several thousands of mailpieces) and in which the mailpieces are of very stable graphical structure. Furthermore, such manual techniques for identifying runs are not suitable for sorting large-format mailpieces with which the runs have much smaller volumes, of the order of about one hundred mailpieces per run.

Patent Document EP 1 622 065 discloses a method of processing mailpieces as indicated above, and in which appearance of run, i.e. of a succession of uniform mailpieces having the same graphical appearance, is detected automatically. In that known method, digital models of runs are built automatically as the processing progresses and on the basis of the digital images of the uniform mailpieces. Those digital models of runs are stored automatically in a database that constitutes a kind of dictionary of run models, and each digital image of a mailpiece during the sorting process is compared with the run models stored in the dictionary, and if one of the models corresponds to the digital image of the current mailpiece, indications are extracted from the model for the automatic recipient address recognition process. That process for automatically building run models is mainly suitable for runs of small volume, but if the identifiers of the mailpieces in the machine are signatures of digital images as described in Patent Document EP 1 519 796, it is possible to use those run models not only in the first sorting pass but also in the other, subsequent sorting passes so as to reinforce the robustness of the address recognition processing.

However, in that known method, each run model is built only after a sufficient number of mailpieces constituting the run have passed through the machine, so that the first mailpieces in the run do not enjoy reinforced address recognition processing.

Patent Document EP 1 622 065 discloses on-line creation of run models while the mailpieces of the run are passing through the sorting machine. The run model is thus built automatically, and the setting indications for the optical character recognition (OCR) processing are also associated automatically. Patent Document US 2009/0 141 934 discloses a method of processing mailpieces, in which method a separator representing the region of interest for the OCR is fed through the machine. Patent Document US 2004/0 005 080 discloses a method of processing mailpieces, in which method the operator sets the sorting machine directly for sorting running mailpieces. Those other known methods do not enable the first mailpieces in the run to enjoy reinforced address recognition processing.

SUMMARY OF THE INVENTION

An object of the invention is thus to improve further the effectiveness of identifying runs in batches of mailpieces.

The basic idea of the invention is to be able to generate models of runs in advance of the mailpieces of the runs passing through the sorting machine, these models being digital models compatible with the digital models of runs that are generated automatically as the processing progresses as described above. The invention stems from the idea of using an interactive acquisition terminal connected to a database to input the digital image of a mailpiece of the run, this mailpiece being taken by an operator from the stream of mail before the mail arrives at the inlet of the sorting machine for a first sorting pass.

To this end, the invention provides a method of processing uniform or mailpieces or "runs", in which, in a mail preparation zone, the mailpieces of a "run" are prepared in trays or on trolleys, and the prepared mailpieces are brought to the inlet of a postal sorting machine for a first sorting pass, and in which the mailpieces are fed in series into the sorting machine comprising a sorting conveyor and sorting outlets, a digital image of each mailpiece is formed in the sorting machine, and processing is applied to each digital image for automatically recognizing address information for the purpose of automatically directing the corresponding mailpiece through the sorting conveyor towards a determined sorting outlet of the sorting machine, said method being characterized by the following steps in advance of the first pass of the mailpieces of the run through the sorting machine:

a) using an interactive acquisition terminal that is located remote from the sorting machine to form a digital image of a certain mailpiece of the run, the interactive acquisition terminal comprising a scanner with a camera, a presentation stand on which an operator places the certain mailpiece of the run flat and facing the camera in order to input a digital image of the face of the mailpiece that bears a recipient address, and a man/machine interface with a display screen and with a keyboard, which interface is connected to a data-processing unit connected to the database;

b) in the data-processing unit and on the basis of this digital image, computing attributes or descriptors of the run so as to build the digital run model in the database; and c) in the database, associating the run model with the setting indications from the interactive acquisition terminal, the indications also being input from the interactive acquisition terminal.

With the method of the invention, it is possible, automatically and in a local database of the sorting machine, to build first digital run models as indicated above, while second graphical run models can be built from one or more remote interactive acquisition terminals in another database hosted, for example, in a server that is remote from the sorting machine but that can be accessed by it via a communications network such as the Internet. The first and second graphical run models may be consolidated and used during the first sorting pass and also during the subsequent passes as indicated above. A digital run model generated automatically or through an interactive acquisition terminal consists of digital data that characterizes the graphical appearance of the mailpieces of a run as it appears in the digital images of the mailpieces of the run. This digital data is like attributes or descriptors that represent the physical characteristics of the digital images and that are chosen to be invariant on rotation of the digital images. These descriptors may be based on characteristics of the pixels in the digital images in gray scale or in binary format (after binarization or thresholding), which characteristics are local using partitioning (segmenting of the digital image), multi-scale, or global, as described in Patent Document EP 1 519 796. The data may, for example, be luminance statistics. Whether a digital image of a mailpiece belongs to a run model may be established using a criterion of graphical resemblance, e.g. a criterion based on a normalized correlation coefficient applied to the digital descriptors of the model and of the digital image of the mailpiece in question.

According to a feature of the invention, the indications input via the interactive acquisition terminal are constituted by data locating in two dimensions a region of interest in a digital image of a mailpiece. This region of interest may be the recipient address block on the mailpiece. The region of interest may also be the recipient address block or indeed the franking region, a region bearing advertising such as a logo or a slogan, or any other region specific to a type of mail (e.g. parcels), in which region a certain piece of information is to be recognized automatically (generally by OCR), e.g. so as to be subjected to particular data-processing downstream from the process of automatically recognizing the address information.

According to another feature of the method of the invention, the indications input via the interactive acquisition terminal are constituted by data designating a particular processing algorithm, e.g. a particular algorithm for binarizing the pixels of a digital image. For example, recipient addresses printed by ink jet on a plastics medium of the "opaque strip" type can very often be seen through the plastics film amongst a multitude of other symbols or graphics. As a result, automatically recognizing this address information is complex and proper recognition depends on the choice of the binarization algorithm that is applied to the gray-scale digital image.

In accordance with the invention, the interactive acquisition terminal may have a plurality of binarization algorithms and the operator on the interactive acquisition terminal may help with choosing the optimum binarization algorithm for associating it in the database with the corresponding digital run model.

According to yet another feature of the method of the invention, the indications input via the interactive acquisition terminal may further include data designating a mailpiece sender, in particular a bulk mailer. This designation data may consist in the name of the sender that can be input via a computer keyboard from the terminal. While the mailpieces are being sorted with runs being detected, it is then possible, in the memory, to associate the run models with data resulting from the recognition of information in the digital images of the mailpieces for the purposes of establishing statistics, e.g. by computing a rate of proper recognition of recipient addresses per run model, or indeed per sender referenced in the run models.

According to yet another feature of the method of the invention, the sorting machine is located in a postal sorting center that includes a mail preparation zone in which the mail is stored in receptacles so as to be brought to the sorting machine. This preparation zone is typically situated between the docking bays at which the mail arrives by truck, train, or aircraft, and the sorting zone itself where the sorting machine is placed. In accordance with the invention, the interactive acquisition terminal is advantageously placed in said mail preparation zone of the inward sorting center or of the delivery office in order to optimize the work of the operator who is then able to identify rapidly the running mailpieces in the stream of mail. The digital run models are thus created in advance of the stage during which the mailpieces are sorted in the sorting machine, i.e. upstream from the first sorting pass, thereby not delaying the sorting process and, at the same time, reinforcing the robustness of the process of automatically recognizing addresses in the digital images of the mailpieces.

By extension of this idea, the digital run models could be input in a routing center upstream from the inward sorting centers or indeed directly at the bulk mailers' sites. From the interactive acquisition terminal, an operator can thus input run models formed in a center for routing various decentralized streams of mail. However, placing interactive acquisition terminals in the mail preparation zones as indicated above constitutes an operational solution that is very simple for mailpiece operators.

BRIEF DESCRIPTION OF THE DRAWINGS

The invention is described below in more detail and with reference to the accompanying drawings which show a non-limiting example of it.

DESCRIPTION OF AN IMPLEMENTATION

Figure 1:
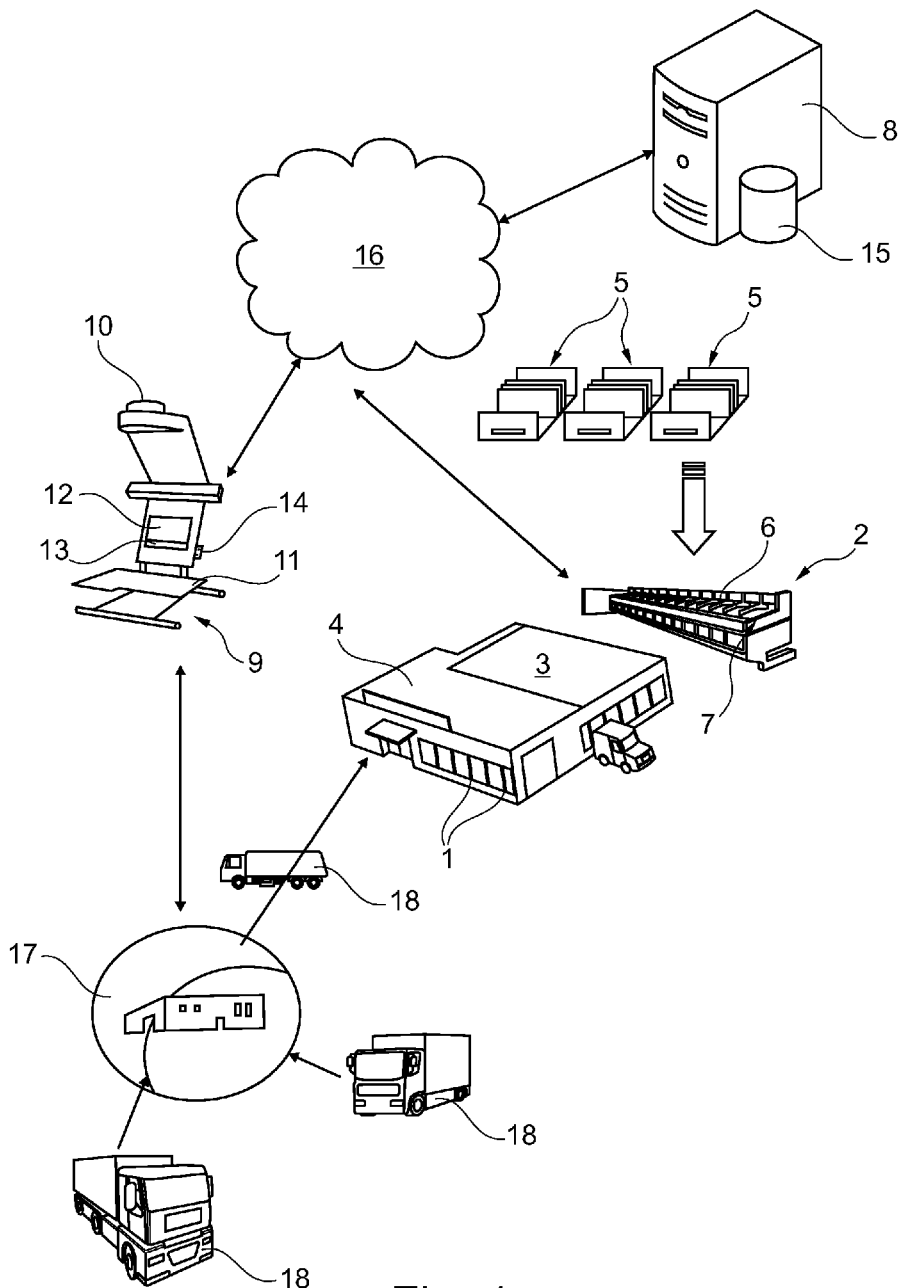
FIG. 1 shows, in highly diagrammatic manner, an interactive acquisition terminal of the invention in an automatic postal sorting facility.

FIG. 1 shows, in highly diagrammatic manner, an environment of an interactive acquisition terminal 9 of the invention for acquiring run models. Thus, docking bays 1 are shown via which mail arrives by truck 18, train, or aircraft, or the like, at a center or facility for preparing and delivering mail, at which mail from businesses (who are mainly bulk mailers) is gathered and delivered.

In this center, a postal sorting machine 2 which is situated in the sorting zone 3 proper is shown as is a mail preparation zone 4 between the docking bays 1 and the sorting machine(s) 2, in which zone the mail is put into trays or onto trolleys with the runs being separated into batches 5 as shown in FIG. 1 before being fed through the sorting machine 2.

In this example, the sorting machine 2 has a sorting conveyor such as 6 and sorting outlets such as 7. The sorting conveyor 6 is a complex system that, in addition to having the mechanical means for conveying the mailpieces, which means include nip belts or the like, incorporates a storage magazine for storing the mail to be sorted, an automatic unstacker that takes the mail from the magazine and, for example, puts it in series and on edge, peripherals of the camera type for forming a digital image of each mailpiece and a data-processing unit in charge of performing the automatic address recognition process for automatically recognizing the addresses in the digital images and for causing the conveyor to operate so as to direct the mail towards the appropriate sorting outlets.

Not all of these various elements of the sorting machine 2 are shown in FIG. 1, but they are well known to the person skilled in the art.

FIG. 1 shows a data-processing unit 8 that is connected to the sorting machine 2 through a communications network 16 such as the Internet or the like. This data-processing unit 8 may be constituted by a network of computers distributed over a plurality of sites.

In the mail preparation zone 4, the mail arriving on pallets at the docking bays is thus placed in handling trays or on specific trolleys so as to be brought to the inlets of the sorting machines 2. The mail prepared in trays or on trolleys can remain in the preparation zone 4, awaiting sorting, for several days as is well known.

In accordance with the invention, provision is made to place one or more interactive acquisition terminals 9 in the mail preparation zone 4 for the purpose of inputting digital models of runs in advance of the mailpieces of the run passing through the sorting machine 2.

As shown in FIG. 1, each interactive acquisition terminal 9 comprises a scanner with a camera 10, a presentation stand 11 for presenting a mailpiece and on which the operator places an exemplary mailpiece of a run flat and facing the camera 10 in order to input a gray scale or color digital image of the face of said mailpiece that bears the recipient's address.

The interactive acquisition terminal 9 also has a man/machine interface of the display screen type 12 with a computer keyboard 13 (e.g. a touch-sensitive keyboard) and a pointer (mouse) 14 that are connected to the data-processing unit 8 (which may be in part internal to the interactive acquisition terminal 9).

In accordance with the invention, this interactive acquisition terminal 9 is connected to a database containing recordings of digital models of runs, which database is shown by 15, through the communications network such as the Internet 16. The interactive acquisition terminal 9 may be placed as close as possible to the batches 5 of mail constituting the runs, and, in this example, in the mail preparation zone 4. This interactive acquisition terminal 9 may also be placed at other places in the mail sorting process upstream from the first sorting pass, e.g. on the bulk mailer's site.

Figures 2, 3:
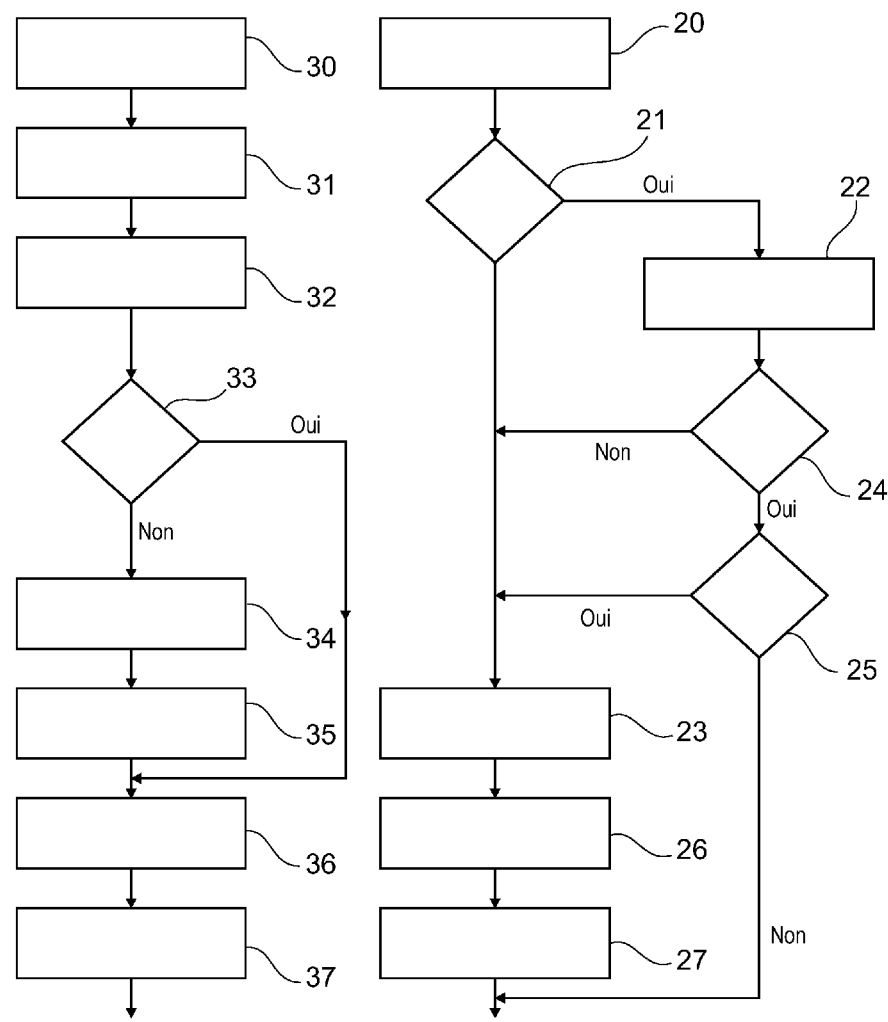
FIG. 2 shows the process of the invention for generating digital models of runs.
FIG. 3 shows the process of the invention for detecting runs.

In accordance with the invention, the interactive acquisition terminal 9 is caused to operate in the following manner, with reference to FIG. 2. The mail of a run is being prepared in the preparation zone 4 of the center by an operator. The operator takes a mailpiece from the run and places it flat on the presentation stand 11 of the interactive acquisition terminal 9 (step 20). A digital image of this mailpiece is input by the camera 10 (e.g. in response to a shot-taking button on the terminal being pushed in) and, on the basis of said digital image, a run model descriptor or attributes are computed by the data-processing unit 8 as indicated above. For example, the data-processing unit 8 extracts from the digital image attributes that are global (i.e. overall) such as the height and the width of the mailpiece, maximum, minimum, and mean values for the luminance of the pixels of the digital image, and the standard deviation, energy, and entropy of the luminance values. Also, the data-processing unit 8 extracts and also computes the maximum, minimum, and mean values for the luminance of the pixels of the digital image, and the standard deviation, energy, and entropy of the luminance values in multi-scale subdivisions of the digital image. These global and local attributes thus constitute a kind of digital signature for the run model input on the interactive acquisition terminal 9.

In the step 21, the model of the run input through the interactive acquisition terminal 9 is compared (by graphical correlation of the numerical attributes) with the run models already recorded in the database 15 and, if a match is detected with a run model already present in the database 15, the process continues at step 22. Otherwise, it continues at step 23.

In step 22, one (or more) run model(s) is/are identified in the database 15. It (the standard digital image of the model) is displayed on the display screen 12 of the interactive acquisition terminal 9. Whereupon, the operator has the option of selecting or of not selecting the displayed model in step 24. If the operator selects the displayed model, said operator has the option of modifying or of not modifying the settings and indications related to the displayed model in step 25. If the operator selects the displayed model in step 24, the process continues at step 25. If the operator does not select the displayed model in step 24, the process continues at step 23. If the operator modifies said settings and indications in step 25, the process continues at step 23. If the operator does not modify said settings and indications in step 25, the process of acquiring a digital run model ends. In step 23, the operator inputs on the interactive acquisition terminal 9 settings or indications such as an indication of the two-dimensional position of the recipient address block (or of the sender address block or of some other block) in the digital images of the mailpieces of the run corresponding to the model in question. The indication of the two-dimensional position of the address block may be obtained, for example, by means of the pointer 14 on the interactive acquisition terminal 9. By way of other indications, the operator may also designate the sender of the mailpiece that is part of the run by name or by a code.

At the end of step 23, the process continues at step 26 for designating a processing algorithm, e.g. a binarization algorithm, specifically adapted to suit the characteristics of the digital images of the mailpieces corresponding to this model of run. Then, the process continues in step 27 by recording the run model together with the associated indications in the database 15.

The most appropriate algorithm can be designated from the interactive acquisition terminal 9 in the following manner. The operator enters information (contents of the address block) into the interactive acquisition terminal 9 and then an iterative information recognition process is triggered. In the various iterations, this process uses various algorithms to be tested so that, after the iterations, it is possible to determine which algorithm is the most appropriate, e.g. the algorithm that gives the result that is closest to the result that was entered by the operator. In the present example, various binarization algorithms may be tested in order to obtain optimum recipient address information recognition, e.g. in the situation when the recipient address is printed on opaque strips of wrapping made of plastic.

While the mailpieces of a run are passing through the sorting machine 2, the process of processing the mailpieces takes place in the following manner with reference to FIG. 3. In step 30, the digital image of the current mailpiece is taken by camera and input into the sorting machine 2. Digital image attributes (or indeed an image signature) are computed on the basis of the digital image in step 31. These attributes are comparable to the attributes of a run model. In step 32, the run models in the database 15 are searched through to detect a match between the attributes of the digital image of the current mailpiece and those of one of the models in the database. The match detection may be based on computing a normalized correlation coefficient and on comparing it with a certain predefined threshold. If a matching run model is detected in step 33, the process continues at step 36 in which the indications associated with the run model are extracted and applied to the processing process downstream, e.g. to the address recognition processing: using a certain binarization algorithm—reading the recipient address in the region of interest identified by the two-dimensional position data. Then, the process continues with step 37 in which, after the address recognition, the result of the recognition is used to direct the current mailpiece automatically through the conveyor towards a predetermined sorting outlet of the sorting machine 2. In addition, the result of the recognition may be recorded in correspondence with the run model in the database 15 for statistical analysis purposes.

If a matching run model is not detected in step 33, the process can continue by automatically generating a new run model with automatic generation of a preferential two-dimensional position of the recipient address block as described in Patent Document EP 1 622 065. After step 33, in step 34, the automatically generated run model is recorded in the database 15 and the process continues in step 36 for this run model.

It should be noted that the dictionary of the run models generated automatically in step 33 in a sorting machine 2 may be consolidated automatically with the run models generated from the terminals 9 during the first sorting pass (or during each subsequent pass) of the mailpieces through the sorting machine 2 without going beyond the ambit of the invention. This consolidation may consist in aggregating the run models in a database, e.g. by deleting duplicates.

It should also be noted that a new run model created automatically in step 24 may, subsequently, be supplemented by a machine operator as indicated above in step 25 of FIG. 2.

In addition, the sender designation indications associated with the run models in the database 15 may be aggregated over various run models corresponding, for example, to a common bulk mailer, without going beyond the ambit of the invention.

For the same senders identified by means of these run models, automatic processing of various regions in the digital images of the running mailpieces may make it possible to perform a mailpiece-by-mailpiece check of the franking details (postage values) and of the quality of presentation of the recipient address, for example, it being possible for the results of said check to be used by the postal operator to modulate the invoicing details related to the sender customer. To this end, these results may be associated with the run model.

FIG. 1 shows a routing center or "outward sorting center" referenced 17 at which decentralized streams of mail brought by truck 18 or the like are merged into runs for lowering the postal sorting costs before being transferred, also by truck 18 or the like, to the inward mail sorting center. The run models can thus be input from the interactive acquisition terminals 9 in the routing center 17 upstream from the inward sorting process.

The invention claimed is:

1. A method of processing uniform mailpieces or "runs", in a mail preparation zone;
   wherein in the mail preparation zone, the mailpieces of a "run" are prepared in trays or on trolleys;
   wherein the prepared mailpieces are brought to an inlet of a postal sorting machine for a first sorting pass;
   wherein the mailpieces are fed in series into the sorting machine comprising a sorting conveyor and sorting outlets;
   wherein a digital image of each mailpiece is formed in the sorting machine, and processing is applied to each digital image for automatically recognizing address information for the purpose of automatically directing the corresponding mailpiece through the sorting conveyor towards a determined sorting outlet of the sorting machine; and
   wherein a digital model of the run is built in a database, said digital run model defined by data characterizing the graphical appearance of the mailpieces of the run and associated in the database with setting indications usable by the automatic recognition processing;
   said method comprising the following steps in advance of the first sorting pass of the mailpieces of the run through the sorting machine:
   a) using an interactive acquisition terminal that is located remote from the sorting machine to form a digital image of a certain mailpiece of the run, said interactive acquisition terminal including a data-processing unit connected to said database;
   b) in the data-processing unit and on the basis of this digital image, computing attributes or descriptors of the run to build said digital run model in said database; and
   c) in said database, associating said digital run model with said setting indications from said interactive acquisition terminal, wherein said indications are also input from said interactive acquisition terminal.

2. The method according to claim 1, wherein the indications input via said interactive acquisition terminal are constituted by data locating in two dimensions a region of interest in a digital image of a mailpiece.

3. The method according to claim 1, wherein the indications input via said interactive acquisition terminal are constituted by data designating a particular processing algorithm.

4. The method according to claim 3, wherein the particular processing algorithm is for binarizing the pixels of a digital image.

5. The method according to claim 1, wherein the indications input via said interactive acquisition terminal further include data designating a mailpiece issuer.

6. The method according to claim 5, wherein while it is being detected whether a current mailpiece is part of a run represented by a certain model recorded in said database, said certain model is associated in the database with data resulting from said recognition processing on the digital image of said current mailpiece.

7. The method according to claim 1, wherein said interactive acquisition terminal is placed in a mail preparation zone of a sorting center, in which zone the sorting machine is located.

8. The method according to claim 1, wherein said interactive acquisition terminal is placed in a mail routing center.

9. A method according to claim 8, wherein other run models are built automatically in said database on the basis of a succession of digital images of mailpieces that are graphically uniform and that are formed in the sorting machine, and wherein these other run models are consolidated with the run models built from an interactive acquisition terminal during a sorting pass of the mailpieces through the sorting machine.

10. The method according to claim 1, wherein other run models are built automatically in said database on the basis of a succession of digital images of mailpieces that are graphically uniform and that are formed in the sorting machine, and wherein these other run models are consolidated with the run models built from an interactive acquisition terminal during a sorting pass of the mailpieces through the sorting machine.

11. The method according to claim 1, wherein the interactive acquisition terminal further includes a scanner with a camera, a presentation stand on which an operator places said certain mailpiece of the run flat and facing the camera in order to input a digital image of the face of said mailpiece that bears a recipient address, and a man/machine interface including a display screen and a keyboard, which interface is connected to the data-processing unit.

12. The method according to claim 11, wherein the indications input via said interactive acquisition terminal are constituted by data locating in two dimensions a region of interest in a digital image of a mailpiece.

13. The method according to claim 11, wherein the indications input via said interactive acquisition terminal are constituted by data designating a particular processing algorithm.

14. The method according to claim 11, wherein the indications input via said interactive acquisition terminal further include data designating a mailpiece issuer.

15. The method according to claim 14, wherein while it is being detected whether a current mailpiece is part of a run represented by a certain model recorded in said database, said certain model is associated in the database with data resulting from said recognition processing on the digital image of said current mailpiece.

16. The method according to claim 11, wherein said interactive acquisition terminal is placed in a mail preparation zone of a sorting center, in which zone the sorting machine is located.

17. The method according to claim 11, wherein said interactive acquisition terminal is placed in a mail routing center.

18. A method according to claim 17, wherein other run models are built automatically in said database on the basis of a succession of digital images of mailpieces that are graphically uniform and that are formed in the sorting machine, and wherein these other run models are consolidated with the run models built from an interactive acquisition terminal during a sorting pass of the mailpieces through the sorting machine.

19. The method according to claim 11, wherein other run models are built automatically in said database on the basis of a succession of digital images of mailpieces that are graphically uniform and that are formed in the sorting machine, and wherein these other run models are consolidated with the run models built from an interactive acquisition terminal during a sorting pass of the mailpieces through the sorting machine.

* * * * *